United States Patent [19]

Bushman

[11] Patent Number: 5,504,486
[45] Date of Patent: Apr. 2, 1996

[54] DETECTION SYSTEM

[75] Inventor: Boyd B. Bushman, Lewisville, Tex.

[73] Assignee: Lockheed Corporation, Forth Worth, Tex.

[21] Appl. No.: 161,554

[22] Filed: Dec. 2, 1993

[51] Int. Cl.$^6$ ................................................ G01S 13/00
[52] U.S. Cl. ............................ 342/90; 342/139; 342/160
[58] Field of Search ............................ 342/90, 139, 160

[56] References Cited

U.S. PATENT DOCUMENTS

| 3,761,929 | 9/1973 | Wyatt | 149/87 |
| 4,318,270 | 3/1982 | Orlich | 60/219 |
| 4,803,489 | 2/1989 | Giori | 342/192 |
| 4,842,247 | 1/1989 | Kurbitz | 250/342 |
| 4,897,660 | 1/1990 | Gold | 342/192 |
| 4,947,044 | 8/1990 | Pinson | 250/330 |
| 5,093,574 | 3/1992 | Pratt | 256/339 |
| 5,233,354 | 8/1993 | Roth et al. | 342/160 |
| 5,247,302 | 9/1993 | Hughes | 342/22 |
| 5,430,448 | 7/1995 | Bushman | 342/52 |

Primary Examiner—J. Woodrow Eldred
Attorney, Agent, or Firm—James E. Bradley

[57] ABSTRACT

A detection system will detect targets against a fixed background if the target is of a type emitting a gaseous plume. The detection system directs electromagnetic energy, preferably radio frequency signals, toward the fixed background in an area of suspected target activity. The detection system has a receiver which detects reflected electromagnetic energy from the fixed background. The system will identify anomalous variations in range. The variations occur as a result of refraction of the electromagnetic energy wave passing through the gaseous exhaust stream. This indicates a probable target which is creating exhaust plume.

9 Claims, 3 Drawing Sheets

5,504,486

DETECTION SYSTEM

BACKGROUND OF THE INVENTION

1. Field of the Invention

This invention relates in general to methods of detecting military objects, particularly employing radar.

2. Description of the Prior Art

Military targets such as airplanes, missiles, tanks and the like have most typically been detected by using radar. Counter measures have been developed to avoid detection. For example, various techniques are employed to reduce the radar cross section or reflectivity of the target.

The military targets of interest in this invention are of a type that emit a gaseous plume, particularly the gaseous plume from a turbojet or missile. The gaseous plume contains burning and unburned hydrocarbons. It is known that radar will reflect a signal from seepage of hydrocarbon gases from oil fields. These return signals, however, are fairly weak.

SUMMARY OF THE INVENTION

In this invention, a method is employed using electromagnetic energy, such as conventional x-band radar. The electromagnetic energy beam is directed toward a fixed background in an area of suspected military target activity. Normally, a return signal will reflect from the background. It has been learned that the radar transmitted signal passing through an exhaust plume is refracted and influenced by the exhaust plume. Anomalous variations in range to the fixed background behind the plume will occur as a result of refraction of the radar signal passing through the gaseous plume. The fluctuations in the fixed background thus indicate to the observer that a military target with an exhaust plume is present.

An experienced observer can visually observe the anomalous variations in range on a radar display. Preferably, the variations are distinguished by processing. Conventional electronics will remove and identify the fluctuating components. This can be handled by subtracting from the radar return at one scan the radar return portions which do not change from a preceding scan. This leaves only the return from the fixed background that has anomalous variations in range.

DETAILED DESCRIPTION OF INVENTION

Figure 1:
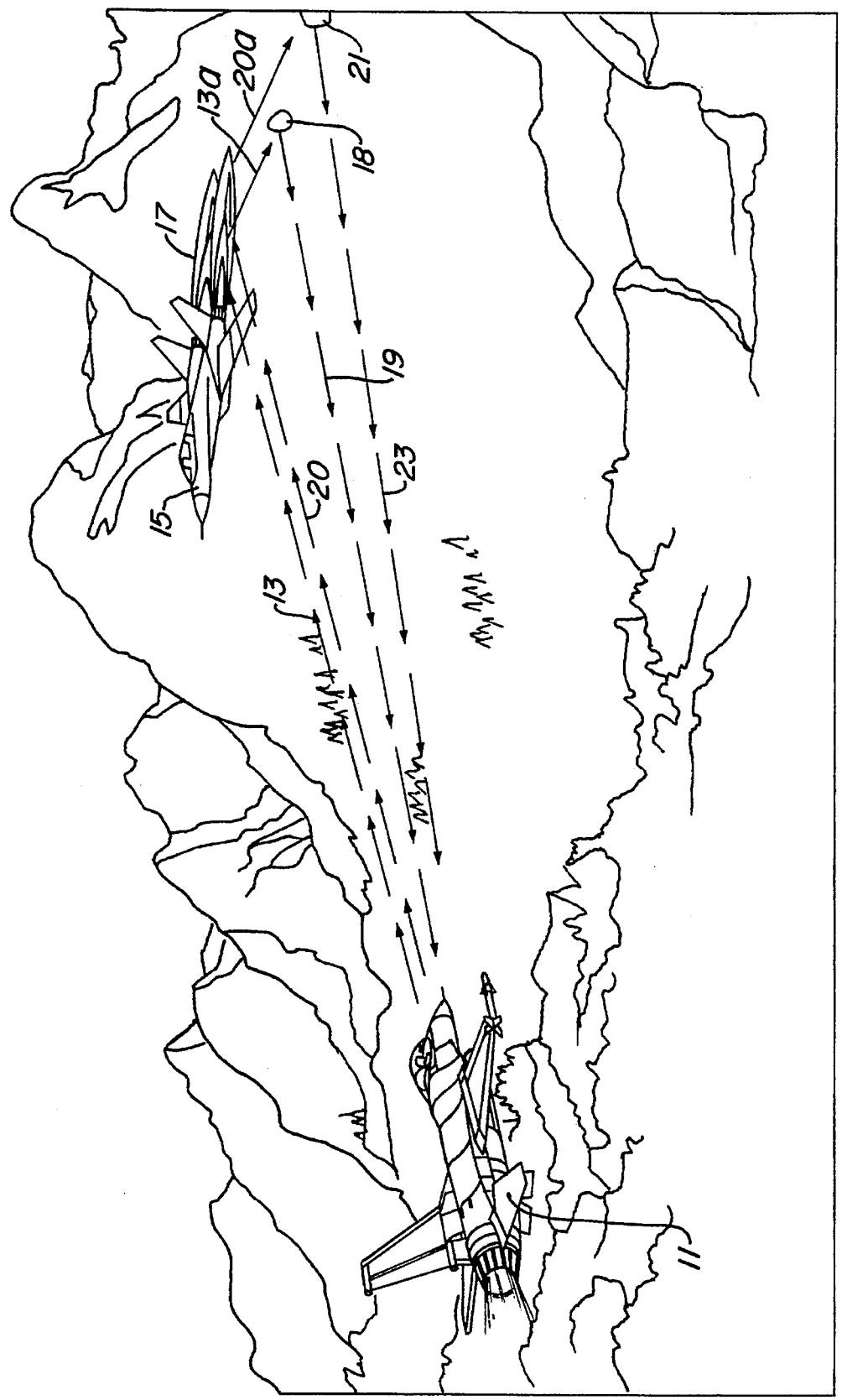
FIG. 1 is a perspective, schematic view illustrating an aircraft having a detection system constructed in accordance with this invention, shown detecting a target aircraft.

Referring to FIG. 1, aircraft 11 has a detection system constructed in accordance with this invention. The detection system preferably employs X-band radar. The detection system transmits an electromagnetic signal or wave 13. With conventional radar, portions of the transmitted wave 13 will strike the stationary background, such as the mountains shown, and be reflected back to aircraft 11 for processing. Normally, reflections from stationary background would be filtered out by conventional noise or clutter elimination techniques. Also, with conventional radar, if a target airplane 15 passed into or through the transmitting wave 13, a reflective wave might be detected by the radar system. Through conventional radar techniques, using Doppler processing, the velocity of the target airplane 15 might be determinable. Due to radar cross-section reduction techniques, however, this type of detection is becoming more difficult, particularly with low-flying aircraft. Some aircraft are designed to reflect very little return signal. This weak signal is hard to distinguish from clutter from the fixed background.

In this invention, the detection system utilizes effects from the exhaust plume 17 of the target aircraft 15. Test data shows that most of the portion of transmitted wave 13 that contacts exhaust plume 17 will pass through exhaust plume 17, eventually striking the background, such as the mountains, trees or buildings, from which it will reflect back as a return signal 19. Point 18 represents a contact point in the background which is contacted by transmitted wave 13 after passing through exhaust plume 17. Point 18 is not on the same straight line as transmitted wave 13. Rather, the exhaust plume 17 creates a lens effect, refracting the wave 13 into a refracted portion 13a, which is at an acute angle relative to transmitted wave 13. The exhaust plume 17 continuously varies, having high and low pressure areas and mach diamonds. Thus there will be a large number of refracted portions 13a, although only one is shown refracting from transmitted wave 13. Return wave 19 comprises one scan or sweep which reflects from background contact point 18 and will be detected by the receiver and processor of the radar system on aircraft 11.

Signal 20 indicates a second transmit wave, emitted from aircraft 11 a short time, or even substantially continuously, after the emission of first transmit wave 13. Second transmit wave 20 also refracts into a portion 20a as it passes through exhaust plume 17. Even if the relative positions of aircraft 11 and aircraft 15 have not varied such that second transmit signal 20 overlies first transmit signal 13, the background contact point 21 will differ from background contact point 18 because of the continuously varying lens effect of plume 17. Refracted portion 20a contacts the background at point 21, and reflects back return wave 23. If target aircraft 15 is capable of being detected itself by conventional radar, it also will provide a return signal due to a portion of the transmitting waves 13, 20 striking the metal skin of target aircraft 15.

Figure 2:
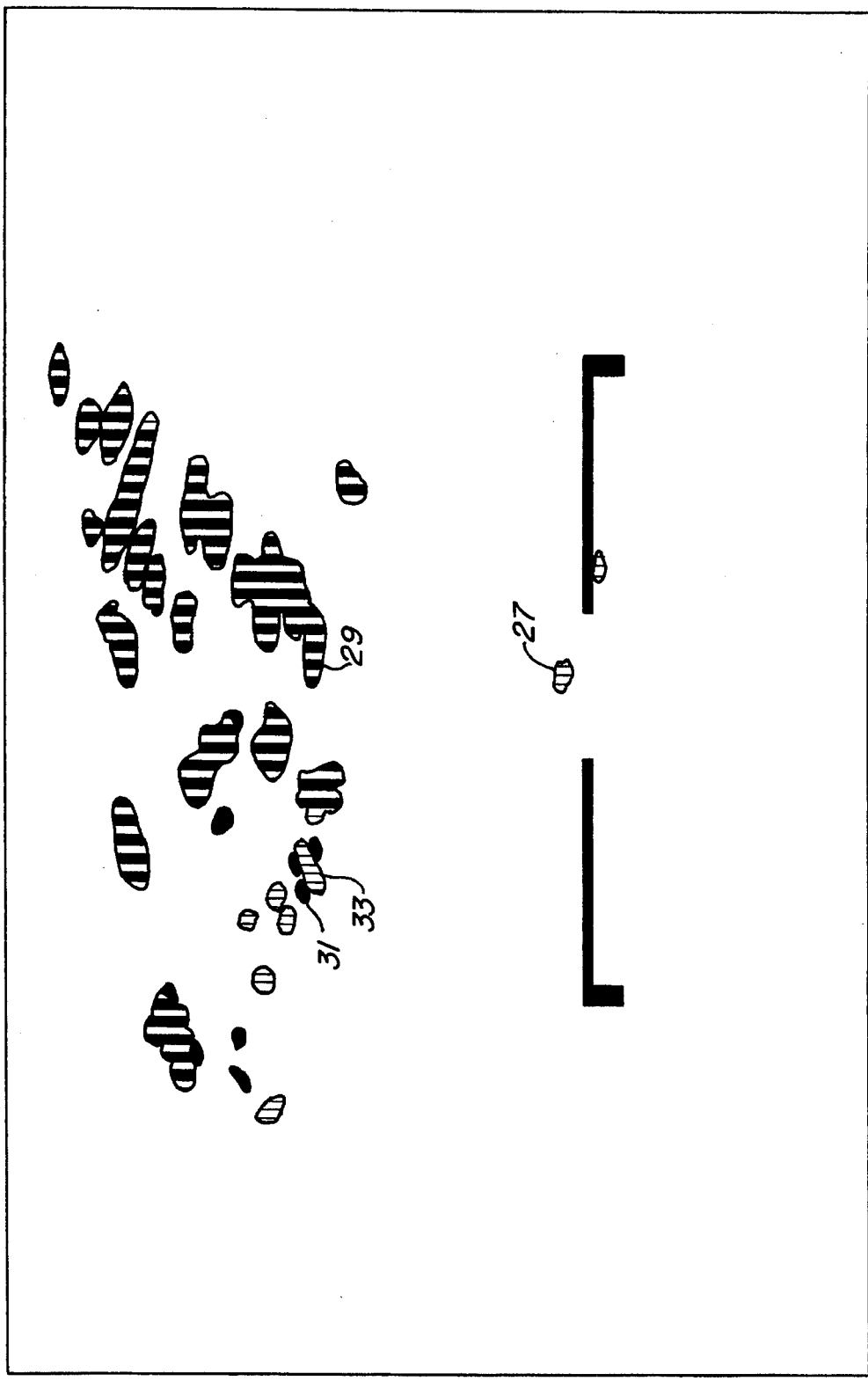
FIG. 2 is a pictorial view of a display screen for a detection system constructed in accordance with this invention, and showing two scans, each having portions of the transmitting signal passing through an exhaust plume.

FIG. 2 illustrates how the refraction of the transmitting waves 13, 20 can be used to detect a target with a low radar cross-section. FIG. 2 is a view of a radar screen 25 taken under actual conditions of an F-16 turbojet airplane located stationarily on an airport taxiway but operating at 90% military power. A number of airport buildings were in the background. The radar transmitter and receiver are conventional and located stationarily. The numeral 27 represents the return signal of the reflection received back from the skin of the airplane. Note that this is a fairly small signal and is closer in range to the transmitter and receiver than nearly all of the other signals. The gain of the radar processor is set such that all of the clutter or background is not eliminated. The numeral 29 and other signals having similar cross-hatching illustrate stationary background, such as buildings or the like, that are not seen through the refracted exhaust plume of the airplane. Each sweep of the radar yields signals 27, 29 at the same range and relative position.

The numeral 31 represents a collection of return signals of one sweep from contact with the background after passing through the exhaust plume. Return signals 31 result from a single transmitted signal, which is the same signal that produced the return signals 27 and 29. These return signals 31 are all colored black. The numeral 33, and those of similar cross-section, represents a collection of return signals of a second sweep from contact with the background after passing through the plume.

The refracted return signals 31 did not occur with the second sweep, although the signals 27 and 29 did reappear in substantially the same form in each sweep. Similarly, the return signals 33 did not exist with the first sweep of the radar transmitting wave. The second refracted background return signals 33 are located at different ranges from the transmitter than the first return signals 31 even though they do represent stationary background objects that did not move between the first sweep to the second sweep.

This indicates that the movement, or fluctuating anomalies of the return signals 31 and 33, is due to the lens effect created by radar signals passing through the exhaust plume and striking the background. Refraction of the electromagnetic wave as it passes through the plume creates the different return signals 31 and 33. Without the exhaust plume, the signals 31 and 33 would not be located at different ranges from one sweep to the other.

From this data, it was determined that even if the aircraft return signal 27 is very low, there will be return signals 31, 33 of substantially greater size than return signal 27. The fairly strong signals 31, 33 can be detected because they do not exist continuously with each sweep of the transmitting wave. There must be a stationary background at some distance behind the target for the refracted electromagnetic waves 31, 33 to return. If the aircraft reflects a signal 27 because of contact by the transmitted wave on its structure, then returning signal 27 will always be closer in range than the refracted background signals 31, 33. The refracted background signals 31, 33 however, can be much larger in magnitude than the aircraft return signal 27.

In the case of a moving target, such as aircraft 15 of FIG. 1, the returning refracted background signals 31, 33 will exhibit Doppler which can be processed conventionally. That is, the refracted background signals 31, 33 will appear to be moving with the aircraft return signal 27. If an aircraft return signal 27 is not detected, the background signals 31, 33 will nevertheless have Doppler and appear to be moving. The signals can be processed to determine not only the range but also the velocity.

Figure 3:
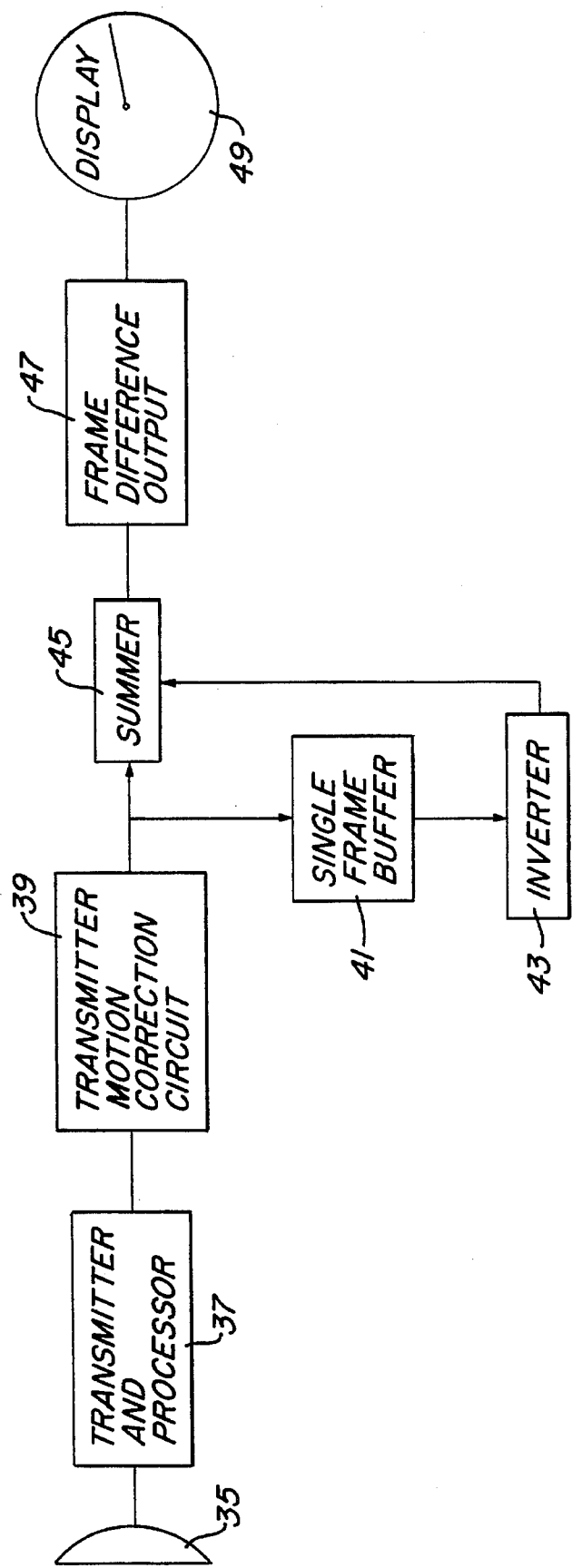
FIG. 3 is a block diagram of the detection system employed with the aircraft of FIG. 1.

FIG. 3 shows that the circuitry for processing the radar signal is made up of conventional components. The numeral 35 indicates the radar antenna while numeral 37 indicates conventional radar transmitting and processing circuitry. The processing circuitry 37 includes not only the electronics for transmitting the signal through antenna 35, but also the circuitry for determining from Doppler techniques the range and velocity.

The signal from the radar circuitry 37 may pass through a platform motion correction circuit 39. Circuit 39 will take into account the velocity of the transmitting aircraft 11, if the detection system is mounted on aircraft 11. If the detection system is mounted on ground, the correction circuit 39 need not be utilized.

The signal from the correction circuit 39 passes through a single frame buffer 41. The signal frame buffer 41 will retain the data from one scan or sweep, pass it through an inverter 43 and to an adder or summer 45. The summing circuitry 45 will also receive the signal directly from the motion correction circuit 39. Summer 45 will sum the inverted scan of the preceding frame with the scan from the next frame. The summing of the two signals thus leaves only those return signals that fluctuate or differ from one scan to the other. Consequently, only the data points 31 and 33 would be passed and signals 29 eliminated.

This set of data points then pass to a frame difference output 47 which will display the result on a display 49. Display 49 would thus provide not the result shown on display 25, but only the anomalies 31, 33. If an aircraft return signal 27 is detected that exhibits Doppler, it too will be processed to determine range. The circuitry for the various components 39, 41, 43, 45 and 47 is conventional and an existing radar set, such as the APG-68, may be utilized to implement the radar components of the system of the present invention.

In operation, referring to FIGS. 1-3, aircraft 11 will emit a radio frequency radar transmit wave 13 in a direction toward an area where suspected targets may occur. When transmit wave 13 strikes plume 17 of target airplane 15, a portion 13a refracts and strikes the background at contact point 18. The return wave 19 returns to aircraft 11 and is processed. The return signals 19 pass through transmitter motion correction circuit 39 and into single frame buffer 41. The return signals 19 are inverted by inverter 43 and pass to summer 45. The return signals 19 will include not only return signals from the refracted portion 13a, but also return signals that contacted background and target aircraft 15 but did not result from a refracted portion.

The next scan occurs from transmit wave 20, which results in return signals 23. Some of the return signals 23 will result from refracted portion 20a, and others from direct contact of transmit wave 20 with background and with the aircraft 15. Return signals 23 are also processed and pass to single frame buffer 41, inverter 43 and summer 45. Because of the different sign, only the return signals from transmit waves 13, 20 that differ in range will pass to the frame difference output 47. These signals, which would be similar to the refraction signals 31, 33 of FIG. 2, are displayed at display 49. These signals are also processed by Doppler processing in processor 37 to determine the velocity of the aircraft 15. Single frame buffer 41, inverter 43, summer 45, and frame difference output 47 thus serve as a filter for identifying anomalous variations in range.

If a return signal occurred as a result of contact with the transmitting waves 13, 20 with the target aircraft 15, this signal would be initially processed with Doppler techniques by processor 37 conventionally. This return signal, similar to signal 27 of FIG. 2, would be closer in range than the refracted background signals 31, 33. The refracted background signals 31, 33 shown on display informs the operator that a plume 17 exists and thus confirms the conventional return signal 27. If there is no return signal 27, the refracted background signals 31, 33 indicate the existence of a plume 17, although its range will not be known. Its range might be determined by triangulation techniques if another transmitting radar at a different location also detected refracted background signals 31, 33.

As an alternate to the circuitry of FIG. 3, the background anomalies 31, 33 of FIG. 2 could also be discerned by a skilled operator visually. As another alternate, a notch filter or high-pass filter may be utilized. The high-pass filter would eliminate all returns except the anomalous variations in range to the points in fixed backgrounds. Those skilled in the art will appreciate that various mathematical techniques, such as Fourier transforms, may also be utilized to process return signals to detect anomalous variations in range to fixed background objects which occur as a result of the lensing effect of an exhaust plume.

The invention has significant advantages. The detection of refracted backgrounds provides a signal from an aircraft that might otherwise be undetectable with conventional radar. The refracted background signal is particularly effective for detecting aircraft which have very low radar cross-sections. The low radar cross-sections which reduce radar reflections of aircraft have no effect on the exhaust plume. These techniques can be employed for any targets in which a background is located behind and which have an exhaust plume. For example, the detection system could be employed for ground military vehicles. The system could also be employed for other uses, such as locating forest fires.

While the invention has been shown in only one of its forms, it should be apparent to those skilled in the art that it is not so limited but is susceptible to various changes without departing from the scope of the invention.

I claim:

1. A method for detecting targets against a fixed background wherein each of said targets emits a gaseous exhaust plume, said method comprising the steps of:

directing electromagnetic energy at a fixed background in an area of suspected target activity;

detecting reflected electromagnetic energy from said fixed background;

identifying anomalous variations in range to selected points within said fixed background within said area which occur as a result of refraction of said electromagnetic energy passing through a gaseous exhaust plume; and identifying a probable target location utilizing said selected points within said fixed background within said area.

2. The method for detecting targets against a fixed background according to claim 1 wherein said step of directing electromagnetic energy at a fixed background in an area of suspected target activity comprises the step of activating a radar system to direct radio frequency energy at a fixed background in an area of suspected target activity.

3. The method for detecting targets against a fixed background according to claim 1 wherein said step of detecting reflected electromagnetic energy from said fixed background comprises the step of detecting reflected electromagnetic energy from said fixed background at a plurality of successive instants.

4. The method for detecting targets against a fixed background according to claim 3 where said step of identifying anomalous variations in range to selected points within said fixed background in an area which occur as a result of refraction of said electromagnetic energy passing through a gaseous exhaust plume comprises the step of subtracting from said reflected electromagnetic energy received at a selected instant each portion thereof which is unchanged from electromagnetic energy received at a preceding instant.

5. A method for detecting targets against a fixed background wherein each of said targets emits a gaseous exhaust plume, said method comprising the steps of:

directing radio frequency electromagnetic energy at a fixed background in an area of suspected target activity;

detecting reflected electromagnetic energy from said fixed background at a plurality of successive instants;

identifying anomalous variations in range to selected points within said fixed background within said area which occur as a result of refraction of said electromagnetic energy passing through a gaseous exhaust plume by subtracting from said reflected electromagnetic energy received at a selected instant each portion thereof which is unchanged from electromagnetic energy received at a preceding instant; and identifying a probable target location utilizing said selected points within said fixed background within said area.

6. A radar system for detecting low altitude targets against a fixed background wherein each of said low altitude targets emits a gaseous exhaust plume, said radar system comprising:

a transmitter for directing radio frequency electromagnetic energy at a fixed background in an area of suspected target activity;

a receiver for detecting reflected electromagnetic energy from said fixed background; and a filter for identifying anomalous variations in range to selected points within said fixed background within said area which occur as a result of refraction of said electromagnetic energy passing through a gaseous exhaust plume wherein a low altitude target emitting a gaseous exhaust plume may be detected.

7. The radar system according to claim 6 further including a display for displaying a range and bearing to said selected points within said fixed background.

8. The radar system according to claim 7 wherein said receiver comprises a receiver for detecting radio frequency electromagnetic energy for detecting reflected radio frequency electromagnetic energy from said fixed background at a plurality of successive instants.

9. The radar system according to claim 8 wherein said filter comprises a means for subtracting from said reflected electromagnetic energy received at a selected instant each portion thereof which is unchanged from electromagnetic energy received at a preceding instant.

* * * * *